United States Patent Office 2,742,580
Patented Apr. 17, 1956

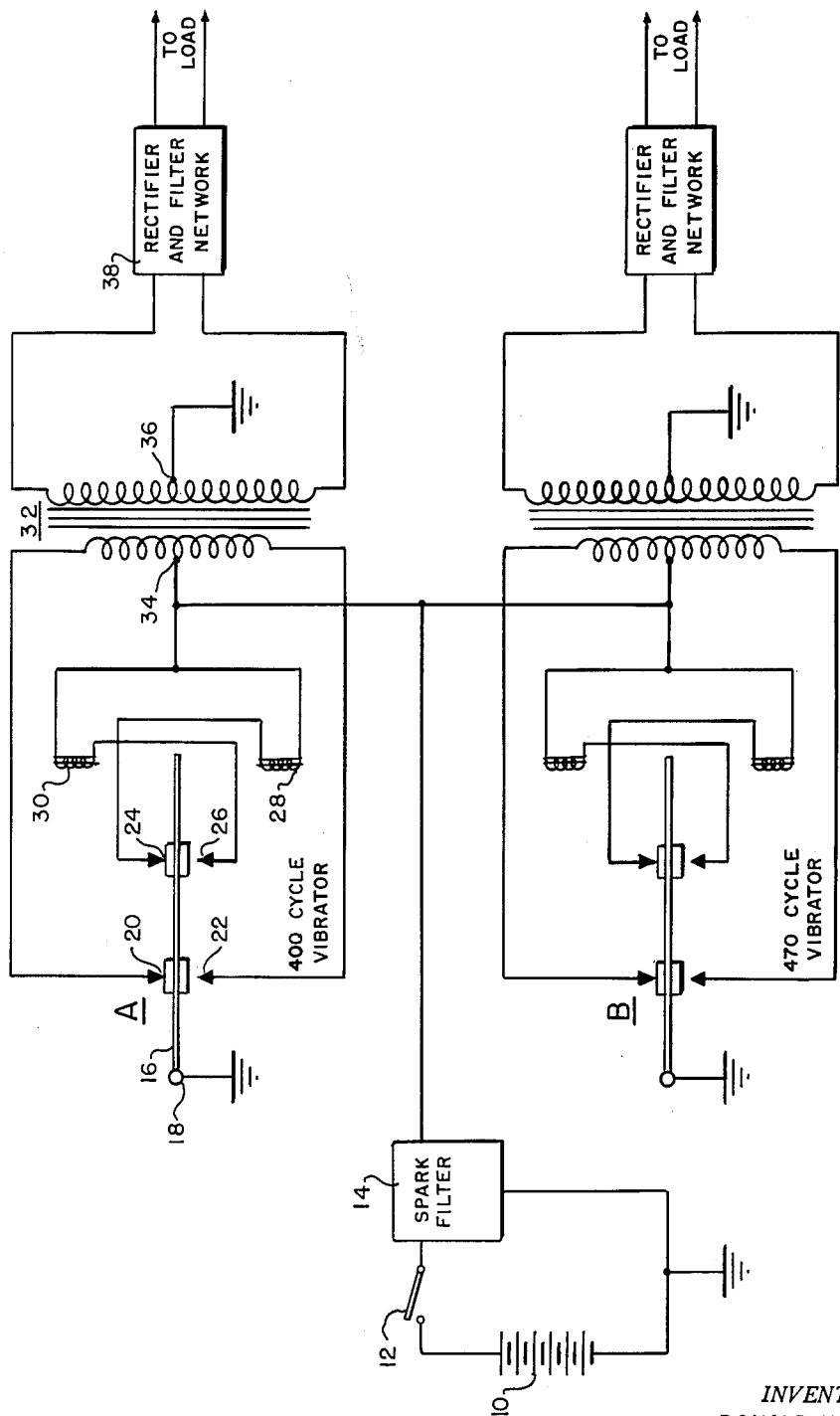

2,742,580

VIBRATOR POWER SUPPLY

Donald H. Holdt, Baltimore, Md., assignor to the United States of America as represented by the Secretary of the Army Application November 16, 1953, Serial No. 392,529

2 Claims. (Cl. 307—82)

This invention relates to vibrator power supplies, and more particularly to an improved power supply having two vibrators operated from a single battery.

In power supplies designed for low powers, usually only one vibrator is used. Few output ripple difficulties are encountered due to the fact that the vibrator operates at only one frequency and an associated filter network, designed to suppress or attenuate the ripple frequency in the rectified output, suffices to obtain a reasonably ripple free output. However, when higher powers are required, two vibrators operating at the same frequency can be used in the power supply, thus permitting a division of the load between the two vibrators. Two almost independent circuits are used, comprising separate transformers, separate rectifiers and separate filter networks. There remains, however, a common impedance in the battery from which both vibrators are operated.

Due to this common impedance, since the frequencies of the vibrators can never, practically speaking, be made identical, an objectionable low frequency flutter develops in the output, since a mixing of the vibrator operating frequencies takes place across the common impedance of the battery.

The most troublesome product of this frequency mixing is the difference frequency of the two vibrators, since the output filters remove the high frequencies but are relatively ineffective at frequencies much below the relatively high ripple frequency for which they are designed. While it is possible to use additional filters to attenuate the relatively low, difference frequency, which manifests itself as a flutter in the output of the power supply, these filters employ chokes that are heavy and physically large, and materially add to the expense, the bulk, and the weight of the completed assembly. It is therefore desired to bring the objectionable low frequency flutter down to a small value without increasing the weight of the power supply.

An important object of the present invention is, therefore, to provide a high power, light weight, relatively ripple free, battery operated, dual vibrator power supply having a minimum of low frequency flutter.

Another important object of the present invention is to accomplish the foregoing by using the same components that normally filter the ripple in the rectified output to also filter the difference frequency flutter that also is present.

The above objects are accomplished by operating the two vibrators sufficiently far enough apart in frequency so that the resulting difference frequency flutter is high enough to be substantially attenuated by output filters normally designed to suppress the usual ripple frequency.

For a more detailed description of the invention, together with other and further objects thereof, reference is now mad to the drawing, wherein the single figure is a schematic circuit of a preferred embodiment of the invention.

In the drawing, there is shown a source of direct current 10, usually a battery, connected through a switch 12 and a spark suppressor filter 14 to two vibrator power supplies A and B, connected in parallel. Except for the fact that the vibrators in the power supplies operate at different frequencies, the power supplies are identical in structure and function, so that a description of power supply A is equally applicable to power supply B.

Power supply A comprises an electromagnetically operated vibrator comprising an electrically conductive vibrator reed 16 connected to ground at point 18 and normally biased in contact with a stationary contact 20, which is connected to one end of the primary of a step-up transformer 32. The other end of the primary is connected to a normally open vibrator contact 22. A normally closed vibrator contact 24 and a normally open contact 26 are respectively connected to one end of each of a pair of magnet coils 28 and 30, the other ends of which, together with the center tap 34 of the primary of transformer 32, are connected to the output of filter 14. The center tap 36 of the secondary winding of transformer 32 is connected to ground and the ends of the secondary winding are connected to rectifier and filter network 38. The output of this rectifier and filter network is applied to the load.

In operation, when switch 12 is closed and reed 16 is in the position shown, current from one terminal of battery 10 flows through spark suppressor filter 14 to vibrator coil 28, contact 24, and reed 16 to the other terminal of battery 10 through ground. Simultaneously, current will flow from the battery to center tap 34 and then through the upper half of the primary winding of transformer 32, contact 20, and reed 16 back to the battery through ground.

As soon as coil 28 is energized, its magnetic attraction pulls reed 16 downward, thereby opening contact 24 and opening the circuit through vibrator coil 28. The upper half of the primary winding of transformer 32 is also disconnected from the battery when reed 16 is drawn down and opens contact 20.

Due to its momentum, reed 16 will continue its movement toward coil 23 until it makes contact with contacts 22 and 26. As soon as this occurs, current flows through vibrator coil 30 and the lower half of the primary winding of transformer 32.

Energization of coil 30 will pull reed 16 back to its original position, thereby repeating the operation first discussed, and the reed will continue to oscillate. This oscillation will cause alternate flow of current in opposite directions through the primary of transformer 32. The alternating current in the primary is stepped up in voltage in the secondary and applied to full-wave rectifier and filter network 38, the resultant D.-C. output of which is then applied to a load.

As noted above, when the two vibrators are operated from the same source in the manner previously described, a mixing of the frequencies at which the vibrators operate will occur due to the common impedance of the source 10, and, practically speaking, it is not feasible to prevent this mixing by attempting to have the vibrators operate at exactly the same frequencies. There is always some slight difference in frequencies between the vibrators which results in a low difference frequency, which frequency is difficult to filter out without having to resort to expensive, heavy, cumbersome chokes. However, it has been found that by making this difference frequency sufficiently high, it may be effectively acted upon by the output filter 38, even though it is designed to most effectively attenuate much higher ripple frequencies. It has been found that in a power supply in which one vibrator is set at 400 cycles and the other vibrator at 470 cycles, so as to obtain a difference frequency of 70 cycles, this difference frequency is effectively filtered by the usual output filters, and there is provided an output having a ripple factor of under 1%.

The outputs of both power supplies A and B can be connected to the load in series or in parallel, or they may be independently connected to separate loads.

It should also be noted that the operating frequencies of the vibrators given in the above example are merely illustrative. Other frequencies are equally suitable. The essence of the invention is that instead of attempting to make the vibrators operate at the same or nearly the same frequency, they are deliberately made to operate at sufficiently spaced frequencies so that the difference of said frequencies is high enough to be effectively attenuated by the usual filters.

While there has been described what is at present considered to be the preferred embodiment of this invention, it will be obvious to those skilled in the art that various changes and modifications may be made therein without departing from the inventive concept herein disclosed.

What is claimed is:

1. A direct current power source comprising a battery and a pair of battery operated vibrator power supplies both connected to said battery and sharing the impedance thereof, each of said power supplies comprising a transformer, a vibrator energized by said battery to intermittently connect said battery to said transformer to provide an alternating current in the output thereof, means to rectify the output of said transformer, and a filter for smoothing the rectified output; the filters of each of said power supplies being similar and the operating frequency of the vibrator of one power supply being sufficiently greater than the operating frequency of the vibrator of the other power supply that the difference frequency flutter in the rectified output is substantially attenuated by said filters.

2. A power supply comprising a direct current source, a pair of vibrators energized by said source and sharing the impedance thereof, one of said pair of vibrators having an output frequency of at most 400 cycles, the other of said pair of vibrators having an output frequency of at least 470 cycles, the difference in said output frequencies producing a beat difference frequency of at least 70 cycles through said impedance, and a pair of similar filter networks respectively coupled to and filtering said output frequencies for attenuating said beat frequency to produce a power supply output having a maximum 1% ripple factor.

References Cited in the file of this patent
UNITED STATES PATENTS

| | | |
|---|---|---|
| 2,410,974 | Huetten | Nov. 12, 1946 |
| 2,468,578 | Vladimir | Apr. 26, 1949 |